(12) United States Patent
Rahman et al.

(10) Patent No.: US 12,292,512 B2
(45) Date of Patent: May 6, 2025

(54) PROVIDING A LOCATION AS A SERVICE

(71) Applicant: Verizon Patent and Licensing Inc., Basking Ridge, NJ (US)

(72) Inventors: Mohammed M. Rahman, Allen, TX (US); Christopher N. Delregno, Garland, TX (US); William F. Copeland, Garland, TX (US); Sumanth S. Mallya, Dallas, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 472 days.

(21) Appl. No.: 17/454,319

(22) Filed: Nov. 10, 2021

(65) Prior Publication Data

US 2022/0066042 A1 Mar. 3, 2022

Related U.S. Application Data

(63) Continuation of application No. 16/398,839, filed on Apr. 30, 2019, now Pat. No. 11,181,643.

(51) Int. Cl.
*G01S 19/07* (2010.01)
*G01S 5/00* (2006.01)
*G01S 19/41* (2010.01)

(52) U.S. Cl.
CPC ............. *G01S 19/07* (2013.01); *G01S 5/009* (2013.01); *G01S 19/41* (2013.01)

(58) Field of Classification Search
CPC ...... G01S 19/07; G01S 19/071; G01S 19/073; G01S 19/09; G01S 19/41; G01S 19/43; G01S 19/49; G01S 5/009
See application file for complete search history.

(56) References Cited

U.S. PATENT DOCUMENTS 5,359,521 A * 10/1994 Kyrtsos ................... G01S 19/41
701/470
10,158,978 B1 * 12/2018 Jantzi ...................... G01S 19/47
(Continued)

FOREIGN PATENT DOCUMENTS

| CN | 101004861 A | * | 7/2007 | |
| CN | 108886667 A | * | 11/2018 | ............ H04W 12/06 |
| CN | 108919819 A | * | 11/2018 | ............ G01S 19/37 |
| CN | 109597429 A | * | 4/2019 | |
| CN | 108919819 B | * | 10/2023 | ............ G01S 19/37 |

(Continued)

OTHER PUBLICATIONS

I. Idris, Real-time vehicle monitoring and positioning using MQTT for reliable wireless connectivity, Master of Information Technology Thesis, Queensland University of Technology (Year: 2017).*

(Continued)

*Primary Examiner* — Bernarr E Gregory
*Assistant Examiner* — Fred H Mull

(57) ABSTRACT

A microservice node can receive a request for information identifying a corrected physical location of a client device. The request can include raw satellite data associated with the client device. The microservice node can convert the raw satellite data to a Radio Technical Commission for Maritime Services (RTCM) format. The microservice node can determine, based on converting the raw satellite data to the RTCM format, an estimated physical location of the client device. The microservice node can receive, based on transmitting a request to a network real-time kinematics (RTK) device, corrections data associated with the estimated physical location of the client device. The microservice node can determine, using a cloud RTK engine, the corrected physical location of the client device based on the estimated physical location and corrections data. The microservice node can transmit, to the client device, the information identifying the corrected physical location of the client device.

20 Claims, 9 Drawing Sheets

(56) References Cited

U.S. PATENT DOCUMENTS

| | | | |
|---|---|---|---|
| 11,181,643 B2* | 11/2021 | Rahman | G01S 19/09 |
| 2004/0140405 A1* | 7/2004 | Meyer | B61L 25/028 |
| | | | 246/122 R |
| 2004/0145516 A1* | 7/2004 | Large | G01S 19/04 |
| | | | 342/357.41 |
| 2005/0064878 A1* | 3/2005 | O'Meagher | G01S 19/43 |
| | | | 455/456.2 |
| 2008/0208454 A1* | 8/2008 | Pesterev | G01C 21/26 |
| | | | 701/467 |
| 2015/0061934 A1* | 3/2015 | Liu | G01S 19/09 |
| | | | 342/357.69 |
| 2016/0003948 A1* | 1/2016 | Loomis | G01S 19/41 |
| | | | 342/357.26 |
| 2016/0116601 A1* | 4/2016 | Horn | G01S 19/44 |
| | | | 342/357.27 |
| 2021/0231814 A1* | 7/2021 | Torimoto | G01S 19/12 |

FOREIGN PATENT DOCUMENTS

| | | | | |
|---|---|---|---|---|
| KR | 20020002034 A | * | 1/2002 | |
| KR | 20150012754 A | * | 2/2015 | G01S 19/12 |
| KR | 2017127912 A | * | 11/2017 | G01S 19/12 |

OTHER PUBLICATIONS

A. Rao et al., Dissemination of GNSS RTK using MQTT, 2021 Joint European Conference on Networks and Communications & 6G Summit (EuCNC/6G Summit): Vertical Applications and Internet of Things (VAP), p. 282-287 (Year: 2021).*

IBM, What is a message broker?, https://www.ibm.com/topics/message-brokers, Retreived Jun. 10, 2024 (Year: 2024).*

N. Brown et al., RTK Rover Performance using the Master-Auxiliary Concept, Journal of Global Positioning Systems, vol. 5(1-2), p. 135-144 (Year: 2006).*

* cited by examiner

PROVIDING A LOCATION AS A SERVICE

RELATED APPLICATION

This application is a continuation of U.S. patent application Ser. No. 16/398,839, entitled "PROVIDING A LOCATION AS A SERVICE," filed Apr. 30, 2019 (now U.S. Pat. No. 11,181,643), which is incorporated herein by reference in its entirety.

BACKGROUND

Global Navigation Satellite System (GNSS) is a generic term for a satellite navigation system that provides autonomous geo-spatial positioning with global coverage. The most ubiquitous of these technologies is the Global Positioning System (GPS).

DETAILED DESCRIPTION OF PREFERRED EMBODIMENTS

Figure 1A:
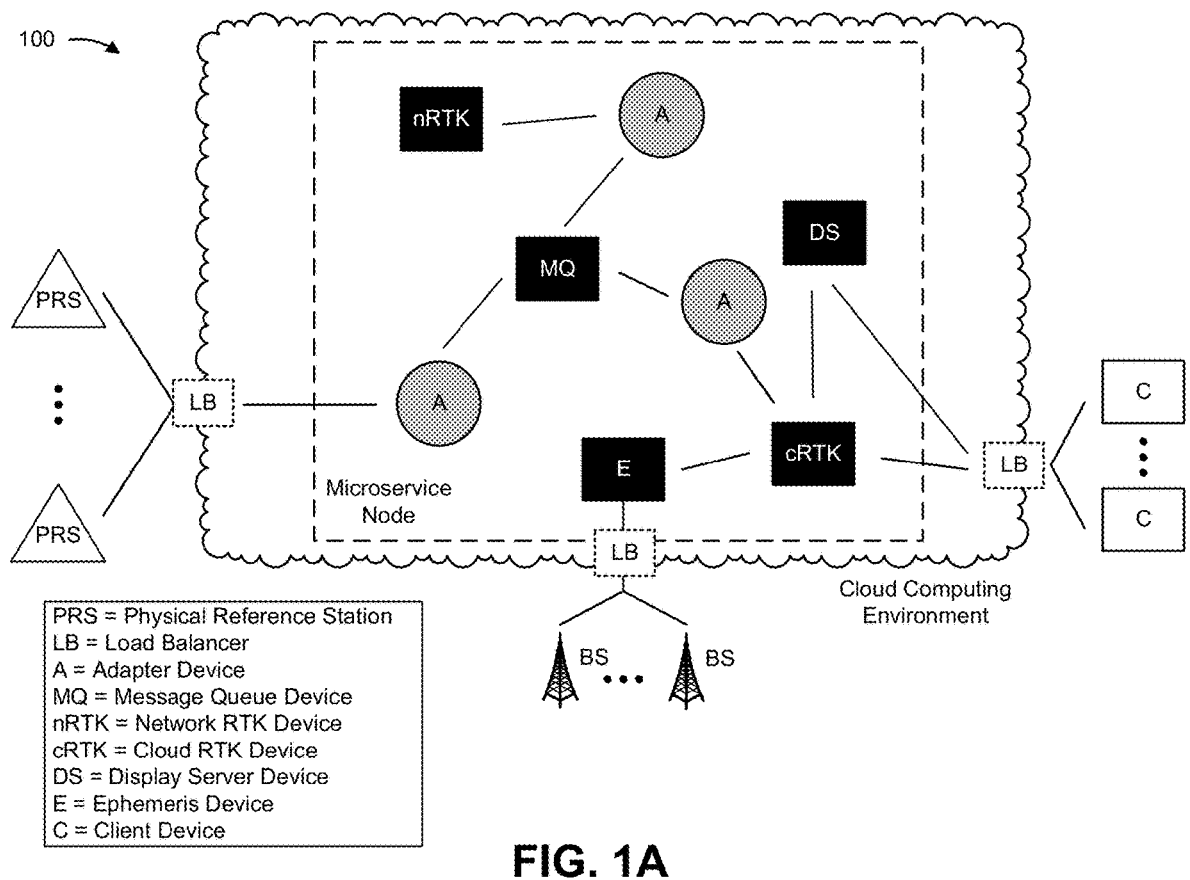
FIGS. 1A-1E are diagrams of one or more example implementations described herein.

The following detailed description of example implementations refers to the accompanying drawings. The same reference numbers in different drawings can identify the same or similar elements.

A global navigation satellite system (GNSS) signal in space provides a worst-case pseudo-range accuracy of 7.8 meters at a 95% confidence level, before any terrestrial biases or errors are introduced, such as ionospheric delay, tropospheric delay, receiver noise, receiver clock errors, signal multipath, and/or the like. These errors can introduce further inaccuracy and/or imprecision (e.g., by several meters).

This level of inaccuracy and imprecision can be tolerated in some applications. For example, a driver of a vehicle can be directed to a wrong side of a building, a block away from a target location, and/or the like, but such inaccuracy and imprecision can be overcome in practice (e.g., when the driver can circle the building, when the driver can see the target location despite being inaccurately directed, and/or the like). However, in many other applications, these limitations could lead to catastrophic results. For example, in an autonomous vehicle application these limitations can result in an autonomous vehicle not being in a right lane to make a turn or pick up a passenger, the autonomous vehicle identifying a curb as a street, the autonomous vehicle drifting into oncoming traffic, and/or the like. Other examples of applications in which such inaccuracy or imprecision cannot be tolerated include autonomous drones, mobile robotics, precision advertising, and many others.

Real-Time Kinematics (RTK) is one solution that allows for GNSS corrections to vastly improve location positioning in order to provide a hyper-accurate location service. RTK leverages a phase of a carrier, without regard to information modulated on the carrier and, as such, can provide greater accuracy, approaching millimeter precision. RTK relies on fixed and well-surveyed physical reference stations to transmit corrections data to in-range RTK-enabled client devices. Because a given physical reference station is well-surveyed, an actual position of the physical reference station is known. Here, the physical reference station receives raw satellite data from a group of satellites, and then transmits the raw satellite data and the known location of the physical reference station to an RTK engine (e.g., at the physical reference station, included in a cloud-based platform, and/or the like), which determines corrections data needed to adjust a given satellite's estimated signal location in order to provide a more accurate physical location. These corrections against the physical reference station can be used by RTK engines, included in the client devices, to make similar adjustments.

In some cases, a client device might not be capable of using corrections data to determine a corrected physical location of the client device. For example, an Internet of Things (IoT) device, a low-power device, and/or a device that has relatively few computing and/or memory resources can be unable to implement an RTK engine. As a result, the client device can be unable to determine and use a corrected physical location of a client device for various applications, such as autonomous driving and/or highly accurate location tracking.

Some implementations described herein provide a cloud-based microservice node that is capable of providing a hyper-accurate location as a service (LaaS) to a client device. The microservice node can be capable of receiving raw satellite data from a client device and determining an estimated physical location of the client device based on the raw satellite data. The microservice node can also be capable of implementing a network RTK engine and a cloud RTK engine. The network RTK engine can determine corrections data based on raw satellite data received from a physical reference station. The cloud RTK engine can use the corrections data and the estimated physical location of the client device to determine a corrected physical location of the client device, and can transmit information identifying the corrected physical location of the client device to the client device. In this way, the microservice node provides a capability for the client device to offload calculation of the corrected physical location to the microservice node, thereby conserving resources of the client device (e.g., processor resources, battery power, memory resources, and/or the like), which permits the client device to use the corrected physical location of the client device for various applications, such as autonomous driving, highly-accurate location tracking, and/or the like. Moreover, this permits the client device to receive and use the corrected physical location of the client device even if the client device does not have the capability to determine an estimated physical location of the client device and/or determine the corrected physical location of the client device.

FIGS. 1A-1E are diagrams of one or more example implementations 100 described herein. In some implementations, one or more example implementations 100 can illustrate a microservice node that is capable of providing a hyper-accurate LaaS and/or a hyper accurate post processed LaaS (PPLaaS) to one or more client devices. The microservice node can be communicatively connected with one or more physical reference stations, one or more base station, and one or more client devices.

A physical reference station can include one or more devices that receive raw satellite data from one or more GNSS satellites, from one or more GNSS satellite constellations, and/or the like. The raw satellite data, associated with a particular satellite (or satellite constellation) can include, for example, a satellite identifier associated with the satellite (e.g., a pseudo-random noise sequence or Gold code that the satellite transmits to differentiate the satellite from other satellites in the satellite constellation), a constellation identifier associated with the satellite constellation, pseudo range observations associated with the satellite and/or each satellite included in the satellite constellation, phase range observations associated with the satellite and/or each satellite included in the satellite constellation (e.g., instantaneous carrier phase and cumulative quantity of complete phase cycles since a last loss of lock), delay observations associated with the satellite and/or each satellite included in the satellite constellation (e.g., delay of the pseudorandom code modulated on a given carrier), received signal strength for each carrier signal from the satellite and/or each satellite included in the satellite constellation, and/or the like. In some implementations, a physical reference station can transmit the raw satellite data to the microservice node, can transmit information identifying a physical location of the physical reference station to the microservice node, and/or the like.

The microservice node can include a system (e.g., one or more devices) capable of providing the hyper-accurate LaaS and/or the hyper-accurate PPLaaS to the one or more client devices. In some implementations, the microservice node can be at least partially implemented in a cloud computing environment (e.g., as shown in FIGS. 1A-1E). As shown in FIG. 1A, the microservice node can include a message queue device, a network RTK device, a cloud RTK device, an ephemeris device, a display server device, one or more adapter devices, and/or the like.

The hyper-accurate LaaS can include a microservice that provides the one or more client devices with real-time or near-real-time corrected physical locations at an accuracy to within centimeters (e.g., hyper accuracy, an accuracy that is not capable of being provided by GNSS systems). This can improve performance of the one or more client devices, applications associated with the one or more client devices (e.g., a ride share application, an application associated with autonomous operation, and/or the like), and/or services provided to users of the one or more client devices (e.g., a ride sharing service, an autonomous navigation service, and/or the like). To provide the hyper-accurate LaaS to a client device, the microservice node can use raw satellite data from the client device and correction data (e.g., generated by the microservice node) in order to determine a corrected (e.g., a more precise) physical location of the client device, and can send information identifying the corrected physical location to the client device. As such, the hyper-accurate LaaS offers the capability for the client device to offload calculation of the corrected physical location to the microservice node, thereby conserving resources of the client device (e.g., processor resources, battery power, memory resources, and/or the like).

The hyper-accurate PPLaaS can include a microservice that provides the one or more client devices with non-real-time corrected physical locations at an accuracy to within centimeters (e.g., hyper accuracy, an accuracy that is not capable of being provided by GNSS systems). In this way, a client device can provide a request for a corrected physical location after the epochs of the client device and a reference station are no longer aligned, and the hyper-accurate PPLaaS can use historical epoch data to post process an estimated physical location in order to determine a corrected physical location.

The network RTK device includes one or more devices capable of providing a network RTK engine for the microservice node. The network RTK engine can be capable of receiving raw satellite data from a physical reference station, capable of storing the raw satellite data in a local data store (or another data store associated with the network RTK engine), and/or the like. In some implementations, the network RTK engine can receive virtual location data associated with a virtual reference station (VRS) and can modify the raw satellite data based on the virtual location data associated with the VRS in order to generate corrections data for the VRS. The virtual location data can indicate a virtual location associated with the VRS.

A VRS can include a reference station that is virtualized (e.g., by a virtual machine and/or virtual container) that is assigned a virtual (or logical) location that corresponds to a physical location in a geographic area between physical reference stations. The virtual location can be a static location (e.g., the VRS is a static VRS that is assigned a virtual location that does not change) or a dynamic location (e.g., the VRS is a dynamic VRS that is assigned a virtual location that can change). The network RTK engine can use an error model (e.g., a model of interpolated terrestrial biases and/or errors), associated with the geographic area, to generate the corrections data for the VRS. In this way, the use of VRS's, in conjunction with physical reference stations, permits the physical reference stations to be spaced further apart (e.g., 50-70 km as opposed to 10-20 km without the use of VRS's), which reduces the cost and complexity of deploying and/or maintaining a network of physical reference stations.

The ephemeris device includes one or more devices capable of receiving, storing, and providing ephemeris data to one or more devices included in the microservice node. Ephemeris data can include data associated with one or more satellites, such as trajectory data, location data, velocity data, and/or the like. In some implementations, the ephemeris device can receive the ephemeris data from the one or more base stations, from one or more physical reference stations, and/or from one or more other devices external to the microservice node. Ephemeris data can be used to estimate physical locations of client devices. In order to speed up the process of estimating physical locations, the ephemeris data can be downloaded and stored by the ephemeris device. In this way, the faster that a physical location of a client device can be estimated using the ephemeris data, the faster a corrected physical location of the client device can be determined.

The cloud RTK device includes one or more devices capable of providing a cloud RTK engine that can determine and provide corrected physical locations to the one or more client devices. The cloud RTK device can be capable of receiving raw satellite data from a client device, receiving ephemeris data from the ephemeris device, determining an estimated physical location of the client device based on the raw satellite data and the ephemeris data, receiving corrections data from the network RTK engine, using the cloud RTK engine to determine a corrected physical location based on the estimated physical location and the corrections data, transmitting information identifying the corrected physical location to a client device as an output of the hyper-accurate LaaS, and/or the like.

Moreover, the cloud RTK device (or another device included in the microservice node, such as a post processor device and/or the like) can provide a post processing engine that is capable of providing the hyper-accurate PPLaaS. The post processing engine can provide an application programming interface (API), such as a representational state transfer (REST) API via which client devices can transmit requests for post processing of estimated physical locations to the post processing engine (e.g., using a hypertext transfer protocol (HTTP) GET method) and which the post processing can transmit corrected physical locations (e.g., using an HTTP POST method). In some implementations, the post processing engine can provide a web portal via which client devices can transmit the requests for post processing of estimated physical locations to the post processing engine and which the post processing engine can transmit the corrected physical locations. In some implementations, the post processing engine can use other techniques to transmit the corrected physical locations to the client devices, such as using file transfer protocol (FTP) and/or the like.

The display server device includes one or more devices that are capable of providing a display server to host information identifying corrected physical locations for the one or more client devices. In some implementations, the display server device can receive the information identifying the corrected physical locations from the cloud RTK device and/or from the one or more client devices. In this way, the display server device can host the information identifying the corrected physical locations so that other devices can view, download, and/or otherwise receive the information identifying the corrected physical locations. This permits information identifying a corrected physical location of a client device to be viewed on another device if, for example, the client device is not equipped with a display device to display the information identifying the corrected physical location.

The message queue device includes one or more devices that can host, store, and/or transmit messages as part of a message queue for the microservice node. In some implementations, the message queue device can implement an Apache Kafka cluster that includes one or more message queues. The one or more message queues can include Kafka topics. The adapter devices can include Kafka producers that can store messages in a Kafka topic and/or Kafka consumers that can subscribe to a Kafka topic to receive alerts (e.g., alerts of messages being added to the Kafka topics) and read messages in a Kafka topic. In this way, the message queue device can provide a means for communication between the devices included in the microservice node, between a device included in the microservice node and an external device, between external devices that communicate via the microservice node, and/or the like. Moreover, load balancers can be appropriately arranged in order to balance traffic between one or more microservice nodes, between one or more devices included in a microservice node and one or more devices external to the microservice node (e.g., between a physical reference station and an adapter device, between a client device and the cloud RTK device, between a base station and the ephemeris device, and/or the like).

Figure 1B:
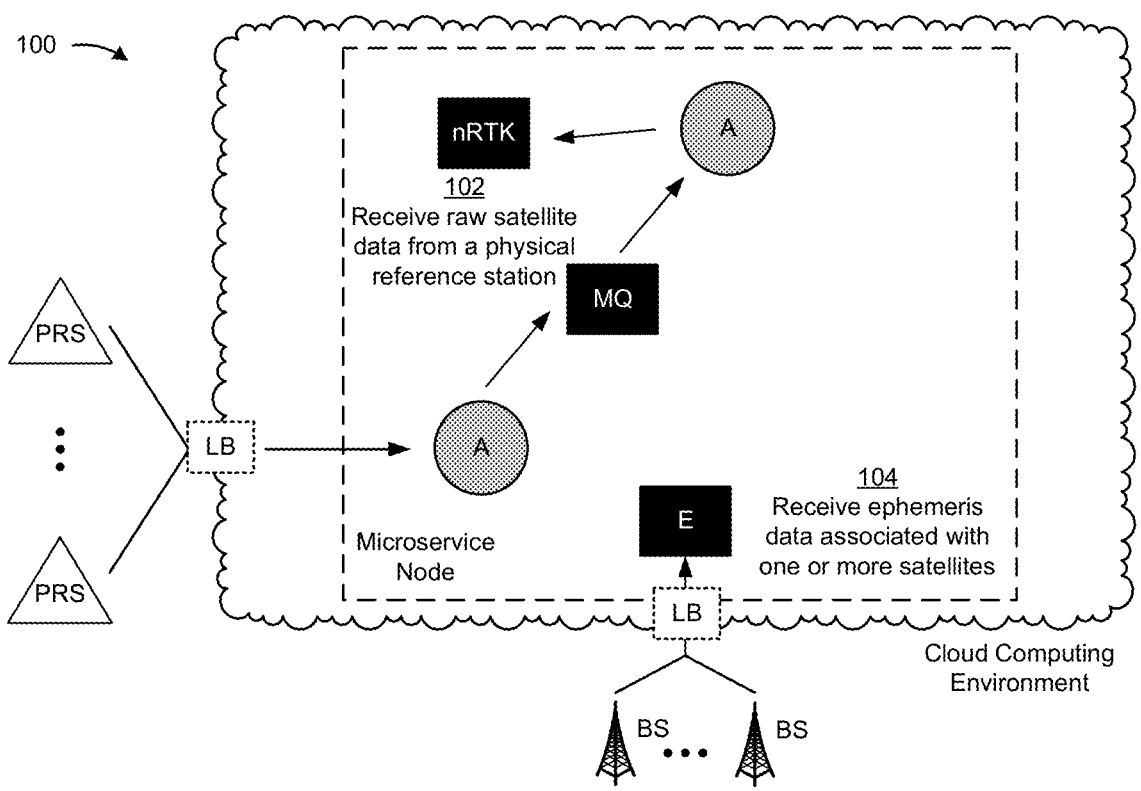

As shown in FIG. 1B, and by reference number 102, in order to store raw satellite data, the network RTK device can receive, from one or more physical reference stations, raw satellite data associated with one or more satellites (and/or satellite constellations). In some implementations, the network RTK device can receive the raw satellite data based on transmitting a request, to the one or more physical reference stations, for the raw satellite data. In some implementations, the network RTK device can receive the raw satellite data based on the one or more physical reference stations receiving the raw satellite data from the satellites included in the one or more satellite constellations. In some implementations, the network RTK device can periodically receive the raw satellite data based on a particular time interval (e.g., every 30 minutes, every hour, and/or the like). In some implementations, the network RTK device can store the raw satellite data in a data store associated with the network RTK device, in a data store provided by the microservice node, and/or the like.

In some implementations, the one or more physical reference stations can provide raw satellite data via a message queue provided by the message queue device. For example, a physical reference station can post a message, to a message queue (e.g., a Kafka topic) associated with the physical reference station, that includes the raw satellite data received by the physical reference station. The physical reference station can transmit raw satellite data to the message queue via an adapter device. The physical reference station can transmit the raw satellite data in a Networked Transport of Radio Technical Commission for Maritime Services (RTCM) via Internet Protocol (NTRIP) format. The adapter device can provide a producer function (e.g., a Kafka producer function) that permits NTRIP casting of raw satellite data to other devices included in the microservice node. The adapter device can further provide a Kafka producer function, which can publish the raw satellite data, in the message, to the message queue.

The network RTK device can receive the message from the physical reference station via the message queue. For example, an adapter device, between the network RTK device and the message queue device, can provide a Kafka consumer function, which can subscribe to the message queue associated with the physical reference station (e.g., the Kafka topic associated with the physical reference station), can receive a notification that the message has been added to the message queue based on subscribing to the message queue, and can retrieve the message from the message queue based on receiving the notification.

As further shown in FIG. 1B, and by reference number 104, the ephemeris device can receive ephemeris data associated with one or more satellites. In some implementations, the ephemeris device can receive the raw satellite data from the one or more base stations, from the one or more physical reference stations, from one or more other devices, and/or the like. In some implementations, the one or more satellites can include the one or more satellites associated with the raw satellite data received from the one or more physical reference stations and/or can include one or more other satellites. For example, the one or more satellites can include the satellites included in a particular GNSS constellation (e.g., the satellites included in the global positioning system (GPS) constellation, the satellites included in the GLONASS constellation, and/or the like).

In some implementations, the ephemeris device can receive the ephemeris data based on transmitting a request for the raw satellite data (e.g., to the one or more base stations, to the one or more physical reference stations, to the one or more other devices, and/or the like). In some implementations, the ephemeris device can receive the ephemeris data based on the one or more physical reference stations, to the one or more other devices, and/or the like receiving the ephemeris data. In some implementations, the ephemeris device can periodically receive the ephemeris data based on a particular time interval (e.g., every 30 minutes, every hour, and/or the like). In some implementations, the ephemeris device can store the ephemeris data in a data store associated with the ephemeris device, in a data store provided by the microservice node, and/or the like.

Figure 1C:
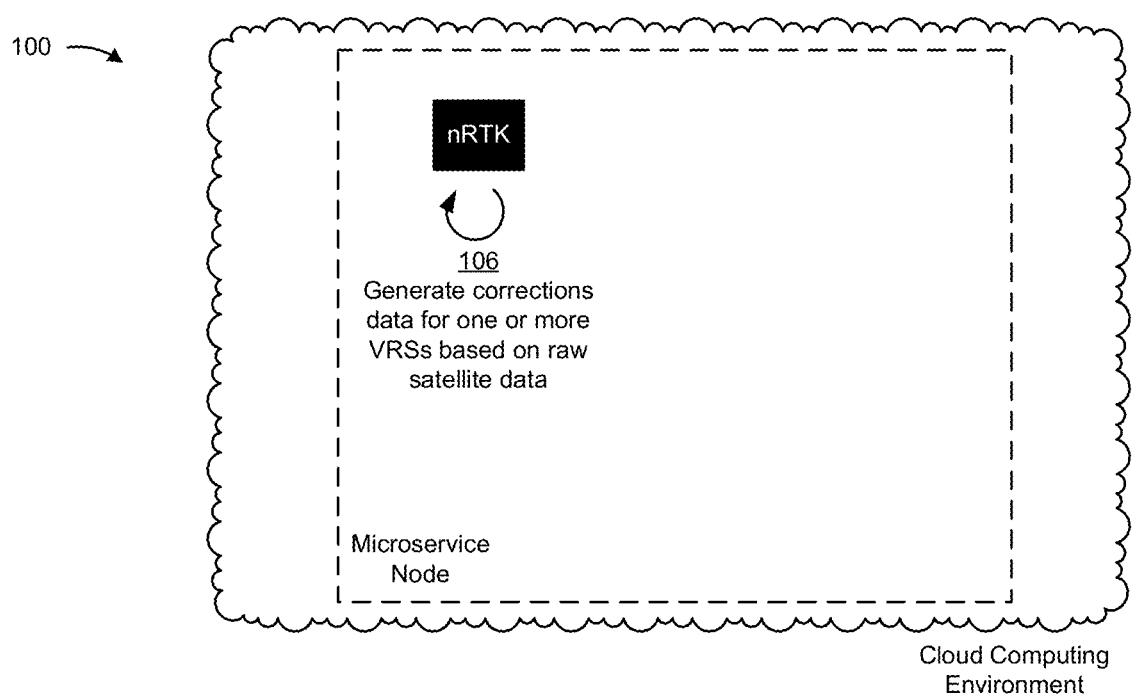

As shown in FIG. 1C, and by reference number 106, the network RTK device can use the network RTK engine to generate corrections data for one or more VRSs based on raw satellite data received from the one or more physical reference stations. In some implementations, the network RTK engine can generate corrections data for a VRS based on a virtual (or logical) location assigned to the VRS, raw satellite data received from one or more physical reference stations, and an error model associated with the geographic area to which the VRS is assigned.

In some implementations, the corrections data can include information identifying corrections for terrestrial biases and/or errors associated with the VRS. The terrestrial biases and/or errors can include ionospheric delay, tropospheric delay, receiver noise, receiver clock errors, signal multipath, and/or the like. The network RTK engine can determine the terrestrial biases and/or errors by determining the terrestrial biases and/or errors based on the raw satellite data and known physical location of a physical reference station, and modifying the terrestrial biases and/or errors for the virtual location of the VRS based on the error model. The error model can include a model of interpolated terrestrial biases and/or errors for the geographic area assigned to the VRS.

In some implementations, the network RTK device can use the network RTK engine to generate corrections data for each static and/or dynamic VRS managed by the network RTK engine in a similar manner as described above. In some implementations, the network RTK device can update the corrections data periodically, based on a request, based on receiving updated raw satellite data from the one or more physical reference stations, and/or the like.

Figure 1D:
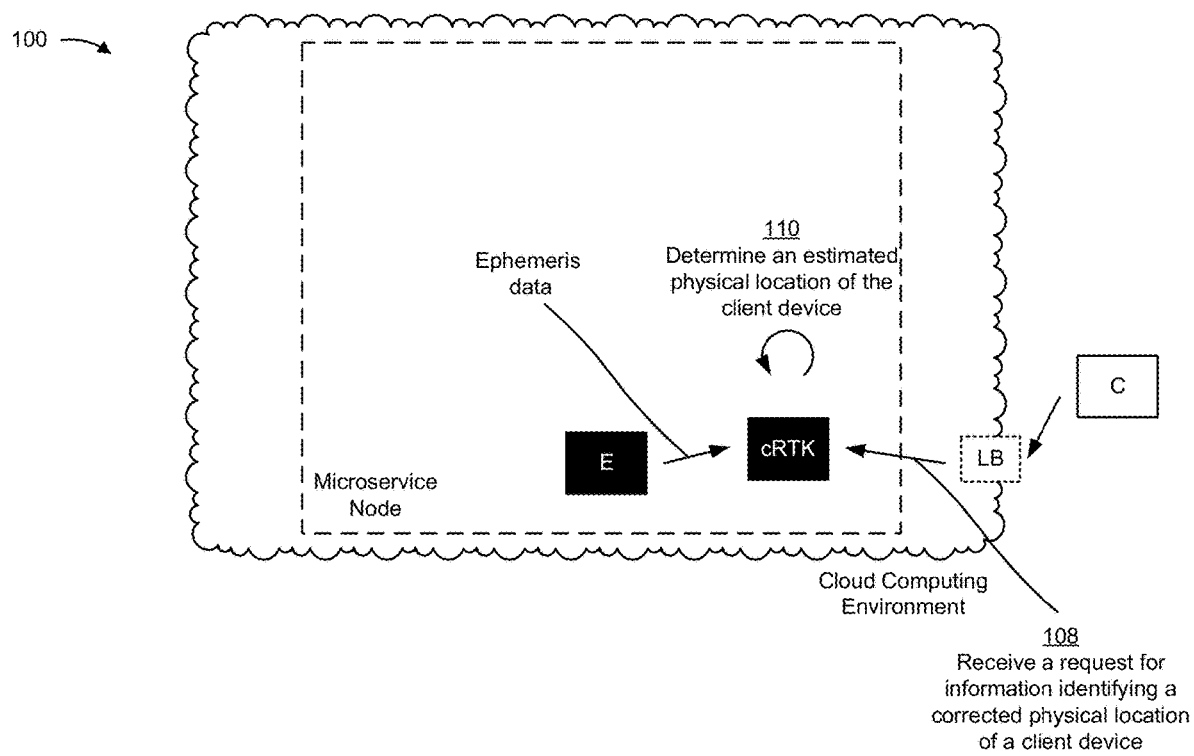

As shown in FIG. 1D, and by reference number 108, the cloud RTK device can receive, from the client device (e.g., a hyper-accurate LaaS client), a request for information identifying a corrected physical location of the client device. The request can include the client device logging onto a web portal or application associated with the hyper-accurate LaaS (e.g., the client device providing a username and password, the client device providing a valid authentication token, and/or the like), transmitting a communication that identifies the request, transmitting a command via an application programming interface (API) provided by the cloud RTK device (e.g., a representational state transfer (REST) API, a web socket API, and/or the like), and/or the like. The request can also include raw satellite data received at the client device and a date and/or time at which the raw satellite data was received. In some implementations, a load balancer (e.g., an Internet load balancer) can direct the request to a particular cloud RTK device, included in the microservice node, based on usage of the hyper-accurate LaaS and/or other microservices provided by the microservice node.

In some implementations, the request can include additional information, such as sensor data associated with the client device, the sensor data can include, for example, acceleration data generated by one or more acceleration devices included in the client device (e.g., an accelerometer, an inertial measurement unit (IMU) and/or the like), physical orientation data generated by one or more orientation devices (e.g., a gyroscope, an IMU, and/or the like), and/or the like.

In some implementations, the raw sensor data, received from the client device in the request, can be received in a format that is not capable of being used by the cloud RTK engine provided by the cloud RTK device. For example, the raw sensor data can be received from the client device in a JavaScript object notation (JSON) format, in an extensible markup language (XML) format, a proprietary format, a binary protocol format, and/or another type of structured electronic file format. The format can be vendor specific (e.g., based on the vendor of the client device), can be operating system specific (e.g., based on the operating system running on the client device), and/or the like. In this case, the cloud RTK device can determine the format in which the raw satellite data is received and can convert the raw satellite data from the received format to an RTCM format so that the cloud RTK engine can use the raw satellite data to determine the corrected physical location of the client device. Moreover, the cloud RTK device can provide a software development kit (SDK) that permits users to develop conversion tools for converting raw satellite data to the RTCM format. In this case, users can develop conversion tools that can be implemented on client devices so that the raw satellite data can be converted to the RTCM format on the client devices.

As further shown in FIG. 1D, and by reference number 110, the cloud RTK device can determine an estimated physical location of the client device. To do so, the cloud RTK device can transmit, to the ephemeris device, a request for ephemeris data associated with one or more satellites (or satellite constellations) identified in the raw satellite data provided by the client device. The cloud RTK device can receive the ephemeris data and can determine the estimated physical location of the client device based on the ephemeris data and the raw satellite data (e.g., using trilateration and/or another GNSS positioning technique).

Figure 1E:
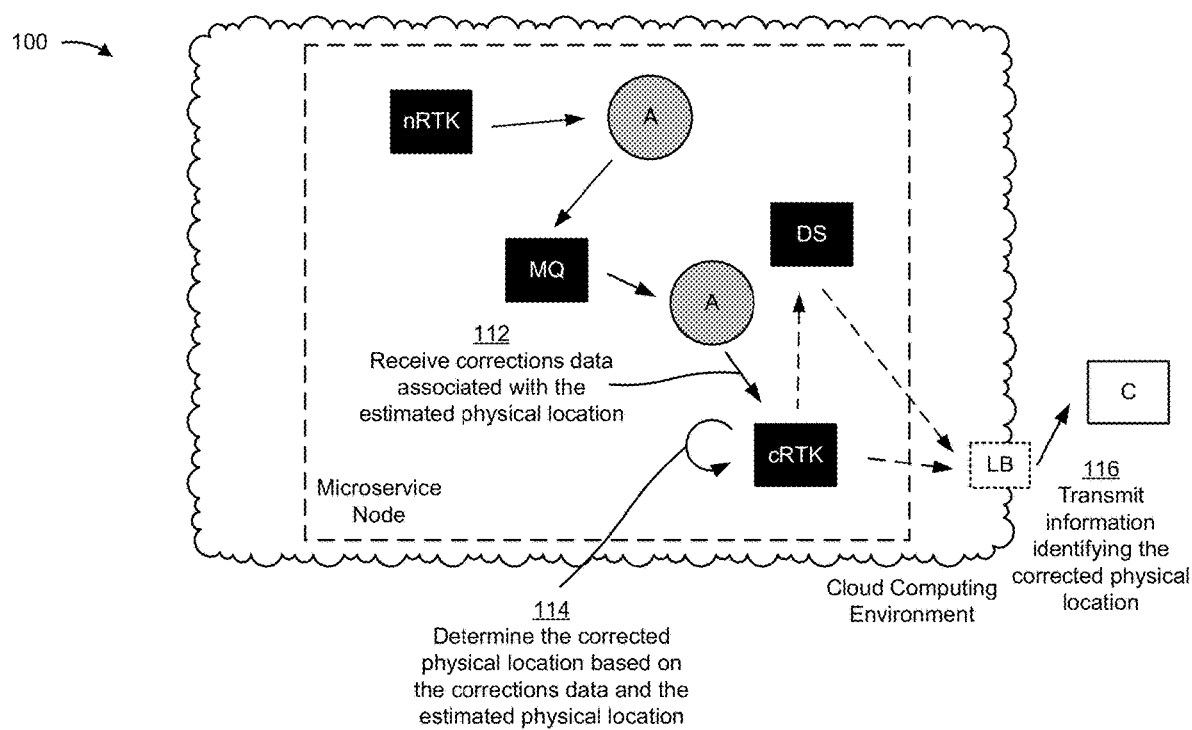

As shown in FIG. 1E, and by reference number 112, the cloud RTK device can receive corrections data associated with the estimated physical location of the client device. In some implementations, the corrections data can be associated with a VRS that is assigned to the geographic area in which the estimated physical location of the client device is located. In this case, the cloud RTK device can identify the geographic area in which the estimated physical location of the client device is located, can identify the VRS assigned to the geographic area, and can receive the corrections data associated with the VRS.

In some implementations, the cloud RTK device can receive the corrections data directly from the network RTK device. In some implementations, the cloud RTK device can receive the corrections data from the network RTK device via a message queue provided by the message queue device. For example, the cloud RTK device can provide an instruction to an adapter device (e.g., between the cloud RTK device and the message queue device) to use a Kafka consumer function to subscribe the cloud RTK device to a message queue associated with the VRS. The network RTK device can make the corrections data associated with the VRS available via the message queue by providing an instruction to the adapter device between the network RTK device and the message queue device to use a Kafka producer function to publish the corrections data in a message in the message queue associated with the VRS. The adapter device between the cloud RTK device and the message queue device can receive a notification from the message queue device that the message is available in the message queue and can, accordingly, retrieve the message from the message queue and provide the corrections data to the cloud RTK device.

As further shown in FIG. 1E, and by reference number 114, the cloud RTK device can determine the corrected physical location of the client device based on the corrections data and the estimated physical location of the client device. To do so, the cloud RTK device can initiate the cloud RTK engine, and the cloud RTK engine can use the corrections for terrestrial biases and/or errors (e.g., ionospheric delay, tropospheric delay, receiver noise, receiver clock errors, signal multipath, and/or the like) identified in the corrections data associated with the VRS to correct the estimated physical location of the client device.

In some implementations, the cloud RTK engine can refine the corrected physical location of the client device based on using various techniques. For example, if the request for the information identifying the correction physical location includes sensor data, such as acceleration data and/or physical orientation data associated with the client device, the cloud RTK engine can use the sensor data to cross-check and refine the correction physical location. The cloud RTK engine can use the acceleration data to determine velocity and displacement of the client device, which can be combined with the physical orientation data to provide inertial navigation as an alternative and/or a checkpoint to the correction physical location. As another example, the cloud RTK engine can refine the corrected physical location of the client device using a Kalman filter and/or another type of filter. The cloud RTK engine can refine the corrected physical location, based on determining the velocity and displacement of the client device from the sensor data, which can be used to smooth the path of travel of the client device to increase the accuracy of the corrected physical location of the client device.

As further shown in FIG. 1E, and by reference number 116, information identifying the corrected physical location of the client device can be transmitted to the client device and/or other devices. In some implementations, the cloud RTK device can transmit the information identifying the corrected physical location to the client device via the web portal, the API, and/or the like. In some implementations, the cloud RTK device can provide the information identifying the corrected physical location to the display server device, and the display server device can host the information identifying the corrected physical location so that other devices can view and/or download the information identifying the corrected physical location from the display server device.

In some implementations, the cloud RTK device can directly transmit the information identifying the corrected physical location to the display server device. For example, the cloud RTK device can automatically provide the information identifying the corrected physical location to the display server device. As another example, the cloud RTK device can transmit the information identifying the corrected physical location to the display server device based on receiving a request from the client device to transmit the information identifying the corrected physical location to the display server device. In some implementations, the cloud RTK device can provide the information identifying the corrected physical location to the display server device based on receiving the information identifying the corrected physical location back from the client device (e.g., as a request to host the information identifying the corrected physical location on the display server device). In some implementations, the cloud RTK device can provide the information identifying the corrected physical location to the display server device based on receiving the information identifying the corrected physical location back from the client device (e.g., as a request to host the information identifying the corrected physical location on the display server device). In some implementations, the client device can directly provide the information identifying the corrected physical location to the display server device based on receiving the information identifying the corrected physical location.

Additionally and/or alternatively, and as indicated above, the cloud RTK device (e.g., using the post processing engine) can provide non-real-time corrected physical locations based on requests for post processing that are received via an API or web portal at the post processing engine. For example, the post processing engine and a client device can use a file upload process as opposed to a real-time streaming input process. The post processing engine can present the client device with the API or web port, wherein the client device can select a local satellite observation file and upload for post processing. The input file format can be a file capture of valid satellite observable binary formats (e.g. RTCM2, RTCM3, uBlox, Novatel, NVS, Swift Binary Protocol, and/or the like), can be in industry standard formats such as Receiver Independent Exchange Format (RINEX), Binary Exchange Format (BINEX), and/or the like. In some implementations, Inertial Measurement Unit (IMU) data can be made available to assist with the post processing engine's post processing of the raw data. The IMU data can be uploaded as well in a variety of binary IMU formats.

The post processing engine can determine the format via a selected format on the upload interface page or can determine the format by analyzing the file and inspecting the data included in the file. The post processing engine can determine the start and stop epochs of the user-supplied data. Using available ephemeris data (e.g., the ephemeris data stored by the ephemeris device), the post processing engine can calculate an estimated physical location of the client device (e.g. code-phase-based uncorrected GNSS position) in order to determine what corrections data is to be used to perform the post processing. If the estimated physical location is not within the network coverage area, the post processing engine can reject the service request and issue a failure message, can use the data from a single closest reference station, and/or the like.

If the estimated physical location is within the network coverage area, the post processing engine transmit a request to network RTK engine (e.g., via the message queue) for the logged reference station observables for one or more stations nearest to the estimated physical location of the client device, and for the time period spanned by the start and stop epoch times of the user-provided data. The post processing engine can determine the precise location of all reference stations or the network RTK engine can provide an antenna reference point (ARP) in the RINEX file supplied for each reference station.

The post processing engine can have configured positioning engine settings and/or can receive processing settings via user interface selections. Settings can include a type of output position (e.g. DGPS, Kinematic, Static), a type of rover receiver application (e.g. static, vehicular, aerial, etc), a preferred constellation and carriers to be used, algorithmic processing direction (e.g. forward, reverse or both), various data filtering options, and/or the like. If IMU data was uploaded, the acceleration data can be used to further improve data filtering as well as assist the ambiguity resolution process in the post processing engine.

The post processing can provide the resultant corrected physical locations in a variety of formats, including NMEA, KML, CSV or a variety of custom or proprietary formats. The corrected physical locations can be stored in one or more electronic files that can be downloaded via the web portal, provided via the API, and/or the like.

In this way, the microservice node is capable of providing a hyper-accurate LaaS and/or a hyper-accurate PPLaaS to a client device. The microservice node is capable of receiving raw satellite data from the client device, and determining an estimated physical location of the client device based on the raw satellite data. The microservice node is also capable of implementing a network RTK engine and a cloud RTK engine. The network RTK engine can determine corrections data based on raw satellite data received from a physical reference station. The cloud RTK engine can use the corrections data and the estimated physical location of the client device to determine a corrected physical location of the client device. In this way, the microservice node provides a capability for the client device to offload calculation of the corrected physical location to the microservice node, thereby conserving resources of the client device (e.g., processor resources, battery power, memory resources, and/or the like), which permits the client device to use the corrected physical location of the client device for various applications, such as autonomous driving, highly-accurate location tracking, and/or the like. Moreover, this permits the client device to receive and use the corrected physical location of the client device even if the client device does not have the capability to determine an estimated physical location of the client device and/or determine the corrected physical location of the client device.

As indicated above, FIGS. 1A-1E are provided merely as an example. Other examples can differ from what is described with regard to FIGS. 1A-1E. For example, while a single microservice node is shown in FIGS. 1A-1E, multiple microservice nodes can be configured (e.g., multiple microservice nodes can be configured on computing resources of the cloud computing environment). In some implementations, one or more microservice nodes can form a hyper-accurate LaaS platform. In other words, one or more microservice nodes can, collectively, operate as a hyper-accurate LaaS platform such that the microservice node can determine corrected physical locations for hundreds, thousands, or even millions of client devices based on raw satellite data from hundreds or thousands of physical reference stations.

Further, FIGS. 1A-1E illustrate a microservice node as including a single message queue device, a single network RTK device, a single cloud RTK device, a single ephemeris device, a single display server device, and a plurality of adapter devices. However, in some implementations, a given microservice node can include one or more of each of these devices. In other words, in practice, a given microservice node can include one or more message queue devices, one or more network RTK devices, one or more cloud RTK devices, one or more ephemeris devices, one or more display server devices, and/or a greater or fewer quantity of adapter devices. In some implementations, load balancers can be appropriately arranged in order to balance traffic between one or more message queue devices, one or more network RTK devices, one or more cloud RTK devices, one or more ephemeris devices, one or more display server devices, and/or one or more adapter devices.

Figure 2A:
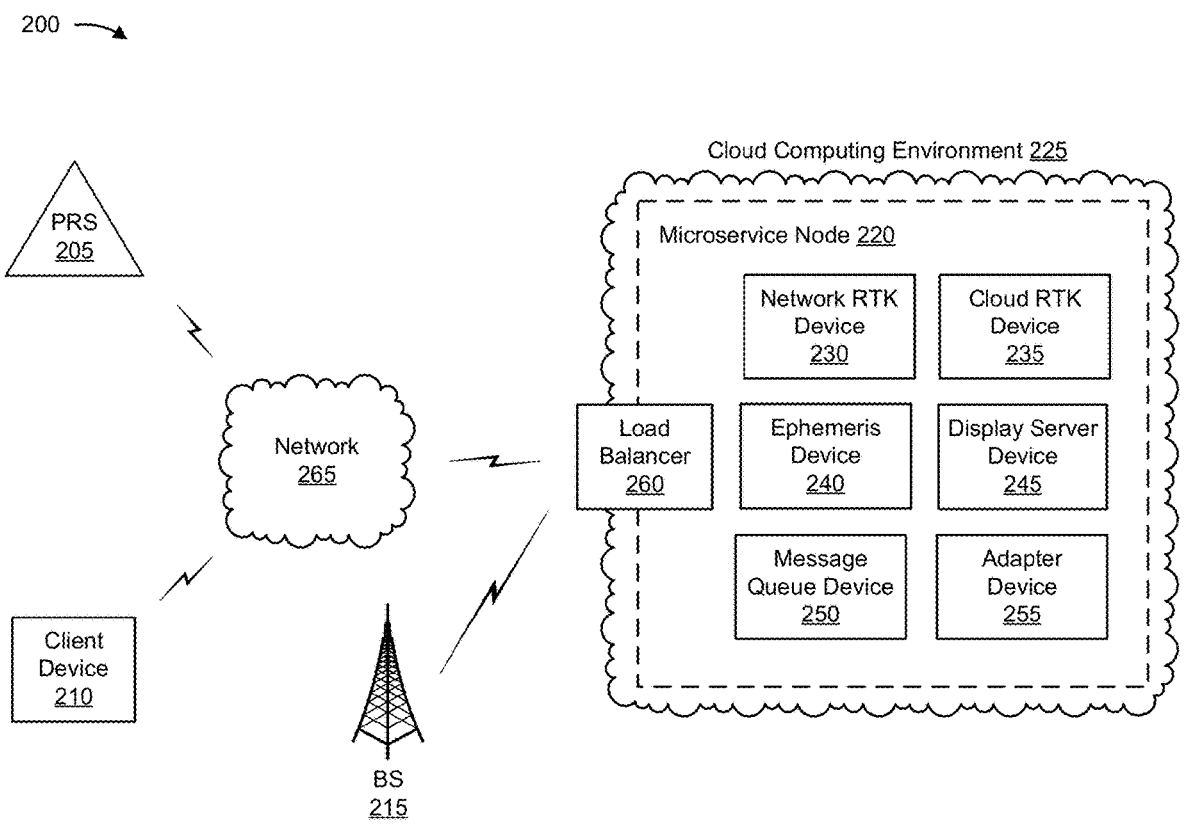
FIGS. 2A and 2B are diagrams associated with an example environment in which systems and/or methods, described herein, can be implemented.
Figure 2B:
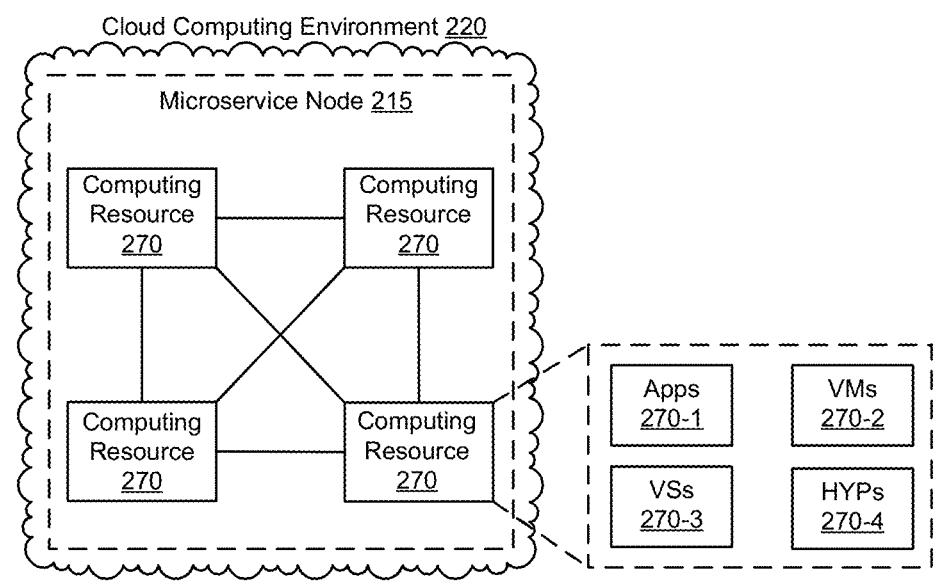

FIGS. 2A and 2B are diagrams associated with an example environment 200 in which systems and/or methods, described herein, can be implemented. As shown in FIG. 2A, environment 200 can include one or more physical reference stations 205 (herein referred to collectively as physical reference stations 205 and individually as physical reference station 205), one or more client devices 210 (herein referred to collectively as client devices 210 and individually as client device 210), one or more base stations 215 (herein referred to collectively as base stations 215 and individually as base station 215), a microservice node 220 (e.g., hosted in a cloud computing environment 225 that includes one or more load balancers 260 (herein referred to collectively as load balancers 260 and individually as load balancer 260), and a network 265. Microservice node 220 can further include one or more network RTK devices 230 (herein referred to collectively as network RTK devices 230 and individually as network RTK device 230), one or more cloud RTK devices 235 (herein referred to collectively as cloud RTK devices 235 and individually as cloud RTK device 235), one or more ephemeris devices 240 (herein referred to collectively as ephemeris devices 240 and individually as ephemeris device 240), one or more display server devices 245 (herein referred to collectively as display server devices 245 and individually as display server device 245), one or more message queue devices 250 (herein referred to collectively as message queue devices 250 and individually as message queue device 250), and/or one or more adapter devices 255 (herein referred to collectively as adapter devices 255 and individually as adapter device 255). Devices of environment 200 can interconnect via wired connections, wireless connections, or a combination of wired and wireless connections.

Physical reference station 205 includes one or more devices capable of receiving, generating, storing, processing, and/or providing information associated with providing a hyper-accurate LaaS, as described herein. For example, physical reference station 205 can include a base station, a reference receiver, and/or the like, that is capable of receiving, generating, storing, processing, and/or transmitting information, such as raw satellite data associated with one or more GNSS satellites, associated with one or more satellite constellations, and/or the like, as described herein.

Client device 210 includes one or more devices capable of receiving, generating, storing, processing, and/or providing information associated with providing a hyper-accurate LaaS, as described herein. For example, client device 210 can include a communication and/or computing device, such as a mobile phone (e.g., a smart phone, a radiotelephone, and/or the like), a laptop computer, a tablet computer, a handheld computer, a gaming device, a wearable communication device (e.g., a smart wristwatch, a pair of smart eyeglasses, and/or the like), a stand-alone navigation device, a device that is integrated into a vehicle (e.g., a built-in navigation device, an infotainment system device, and/or the like), an IoT device, and/or a similar type of device. In some implementations, client device 210 can transmit, to microservice node 220, a request for information identifying a corrected physical location of client device 210 as part of the hyper-accurate LaaS provided by microservice node 220. In some implementations, client device 210 can receive, from microservice node 220, the information identifying the corrected physical location based on transmitting the request.

Base station 215 includes one or more devices capable of receiving, generating, storing, processing, and/or providing information associated with a hyper-accurate LaaS provided by microservice node 220, as described herein. For example, base station 215 can include an eNodeB associated with a Long Term Evolution (LTE) network, a gNodeB associated with a New Radio (NR) network, a base station associated with another type of radio access network (RAN), a small cell base station, such as a base station of a microcell, picocell, and/or a femtocell, and/or the like, that receives ephemeris data associated with one or more GNSS satellites and/or one or more satellite constellations and transmits the ephemeris data to ephemeris device 240.

Microservice node 220 includes a system (i.e., one or more devices) capable of providing a hyper-accurate LaaS, as described herein. Network RTK device 230 includes one or more devices capable of receiving raw satellite data from physical reference station 205, capable of providing a network RTK engine that can store the raw satellite data, can generate corrections data for one or more VRSs based on the raw satellite data and known physical location of physical reference station, can provide corrections data to one or more devices included in microservice node 220, and/or the like.

Cloud RTK device 235 includes one or more devices capable of receiving a request for information identifying a corrected physical location associated with a client device 210, capable of converting raw satellite device, included in the request, to an RTCM format, capable of receiving ephemeris data from ephemeris device 240, capable of determining an estimate physical location of client device 210 based on the raw satellite data and the ephemeris data, capable of receiving corrections data from network RTK device 230, capable of determining the corrected physical location of client device 210 based on the estimated physical location and the corrections data, capable of providing the information identifying the corrected physical location of the client device 210 to client device 210, to display server device 245, and/or another device, and/or the like.

Ephemeris device 240 includes one or more devices capable of receiving ephemeris data from base stations 215, physical reference stations 205, and/or other devices, capable of storing the ephemeris data in a data store, capable of providing the ephemeris data to one or more devices included in microservice node 220, and/or the like.

Display server device 245 includes one or more devices capable of receiving information identifying a corrected physical location of a client device 210, capable of hosting the information identifying a corrected physical location of a client device 210, capable of providing the information identifying a corrected physical location of a client device 210 to one or more device, and/or the like.

Message queue device 250 includes one or more devices capable of providing a message queue for communication between one or more devices included in microservice node 220, between one or more devices included in microservice node 220 and one or more devices external to microservice node 220, between one or more devices external to microservices node 220, and/or the like. In some implementations, message queue device 250 can implement an Apache Kafka cluster that includes one or more message queues. The one or more message queues can include Kafka topics. In some implementations, message queue device 250 can also be referred to as a message broker device, a messaging service device, a message bus device, and/or the like.

Adapter device 255 includes one or more devices capable of providing various communications functions for the devices included in microservice node 220 and/or the devices external to microservice node 220. For example, adapter device 255 can provide a producer function that can store messages in a message queue provided by message queue device 250. As another example, adapter device 255 can provide a consumer function that can subscribe a device to a message queue to receive alerts (e.g., alerts of messages being added to the message queue) and read messages in the message queue.

Load balancer 260 includes one or more devices capable of performing load balancing associated with providing a hyper-accurate LaaS by microservice node 220. For example, one or more load balancers 260 can be arranged to perform load balancing associated with balancing multiple raw satellite data streams (e.g., provided by physical reference stations 205). As another example, one or more load balancers 260 can be arranged to perform load balancing associated with balancing traffic of connections between client devices 210 and cloud RTK device 235. As another example, one or more load balancers 260 can be arranged to perform load balancing associated with balancing multiple ephemeris data streams (e.g., provided by ephemeris devices 240).

In some implementations, as shown, one or more devices of microservice node 220 can be hosted in cloud computing environment 225. Notably, while implementations described herein describe microservice node 220 as being hosted in cloud computing environment 225, in some implementations, microservice node 220 is not cloud-based (i.e., can be implemented outside of a cloud computing environment) or can be partially cloud-based. Additional details regarding cloud computing environment 225 are described below with regard to FIG. 2B.

Network 265 includes one or more wired and/or wireless networks. For example, network 265 can include a cellular network (e.g., a LTE network, a NR network, a 3G network, a CDMA network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

FIG. 2B is a diagram showing example components of cloud computing environment 225 in which one or more microservice nodes 220 can be configured. Cloud computing environment 225 includes an environment that delivers computing as a service, whereby shared resources, services, and/or the like, can be provided. Cloud computing environment 225 can provide computation, software, data access, storage, and/or other services that do not require end-user knowledge of a physical location and configuration of a system and/or a device that delivers the services. As shown, cloud computing environment 225 can include computing resources 270. In some implementations, one or more microservice nodes 220, one or more devices of a given microservice node 220, and/or one or more other devices included in cloud computing environment 225 (e.g., network RTK device 230, cloud RTK device 235, ephemeris device 240, display server device 245, message queue device 250, adapter device 255, load balancer 260, and/or the like), can be implemented using computing resources 270 of cloud computing environment 225.

Computing resource 270 includes one or more servers, groups of servers, computers, or other types of computation and/or communication devices. In some implementations, one or more computing resources 270 can be configured to operate as one or more components of one or more microservice nodes 220. Cloud resources can include compute instances executing in computing resource 270, storage devices provided in computing resource 270, data transfer devices provided by computing resource 270, and/or the like. In some implementations, computing resource 270 can communicate with other computing resources 270 via wired connections, wireless connections, or a combination of wired and wireless connections.

As further shown in FIG. 2B, computing resource 270 can include a group of cloud resources, such as one or more applications ("APPs") 270-1, one or more virtual machines ("VMs") 270-2, virtualized storage ("VSs") 270-3, one or more hypervisors ("HYPs") 270-4, or the like.

Application 270-1 includes one or more software applications that can be provided to or accessed by physical reference station 205, client device 210, base station 215, and/or the like. Application 270-1 can eliminate a need to install and execute the software applications on these devices. For example, application 270-1 can include software associated with microservice node 220 and/or any other software capable of being provided via cloud computing environment 225. In some implementations, one application 270-1 can send/receive information to/from one or more other applications 270-1, via virtual machine 270-2.

Virtual machine 270-2 includes a software implementation of a machine (e.g., a computer) that executes programs like a physical machine. Virtual machine 270-2 can be, for example, a system virtual machine or a process virtual machine, depending upon use and degree of correspondence to any real machine by virtual machine 270-2. A system virtual machine can provide a complete system platform that supports execution of a complete operating system (OS). A process virtual machine can execute a single program, and can support a single process. In some implementations, virtual machine 270-2 can execute on behalf of a user (e.g., client device 210), and can manage infrastructure of cloud computing environment 225, such as data management, synchronization, or long-duration data transfers. In some implementations, virtual machine 270-2 can be another type of virtual machine that provides another type of virtualization. For example, virtual machine 270-2 can be an OS-level virtual machine that provides OS-level virtualization. Notably, while computing resource 270 is shown as including virtual machine 270-2, computing resource 270 can include another type of virtual device in some implementations, such as one or more virtual containers (e.g., Docker, Kubernetes, LXC, workload partitions, and/or the like).

Virtualized storage 270-3 includes one or more storage systems and/or one or more devices that use virtualization techniques within the storage systems or devices of computing resource 270. In some implementations, within the context of a storage system, types of virtualizations can include block virtualization and file virtualization. Block virtualization can refer to abstraction (or separation) of logical storage from physical storage so that the storage system can be accessed without regard to physical storage or heterogeneous structure. The separation can provide administrators of the storage system flexibility in how the administrators manage storage for end users. File virtualization can eliminate dependencies between data accessed at a file level and a location where files are physically stored. This can enable optimization of storage use, server consolidation, and/or performance of non-disruptive file migrations.

Hypervisor 270-4 provides hardware virtualization techniques that allow multiple operating systems (e.g., "guest operating systems") to execute concurrently on a host computer, such as computing resource 270. Hypervisor 270-4 can present a virtual operating platform to the guest operating systems, and can manage the execution of the guest operating systems. Multiple instances of a variety of operating systems can share virtualized hardware resources.

In some implementations, one or more microservice nodes 220 and/or one or more components of a given microservice node 220 can be implemented in one or more computing resources 270. For example, one or more microservice nodes 220 and/or one or more components of a given microservice node 220 can be implemented (as software) using one or more APPs 270-1, one or more VMs 270-2, and/or the like.

The number and arrangement of devices and networks shown in FIGS. 2A and 2B are provided as examples. In practice, there can be additional devices and/or networks, fewer devices and/or networks, different devices and/or networks, or differently arranged devices and/or networks than those shown in FIGS. 2A and 2B. Furthermore, two or more devices shown in FIGS. 2A and/or 2B can be implemented within a single device, or a single device shown in FIGS. 2A and/or 2B can be implemented as multiple, distributed devices. Additionally, or alternatively, a set of devices (e.g., one or more devices) of environment 200 can perform one or more functions described as being performed by another set of devices of environment 200.

Figure 3:
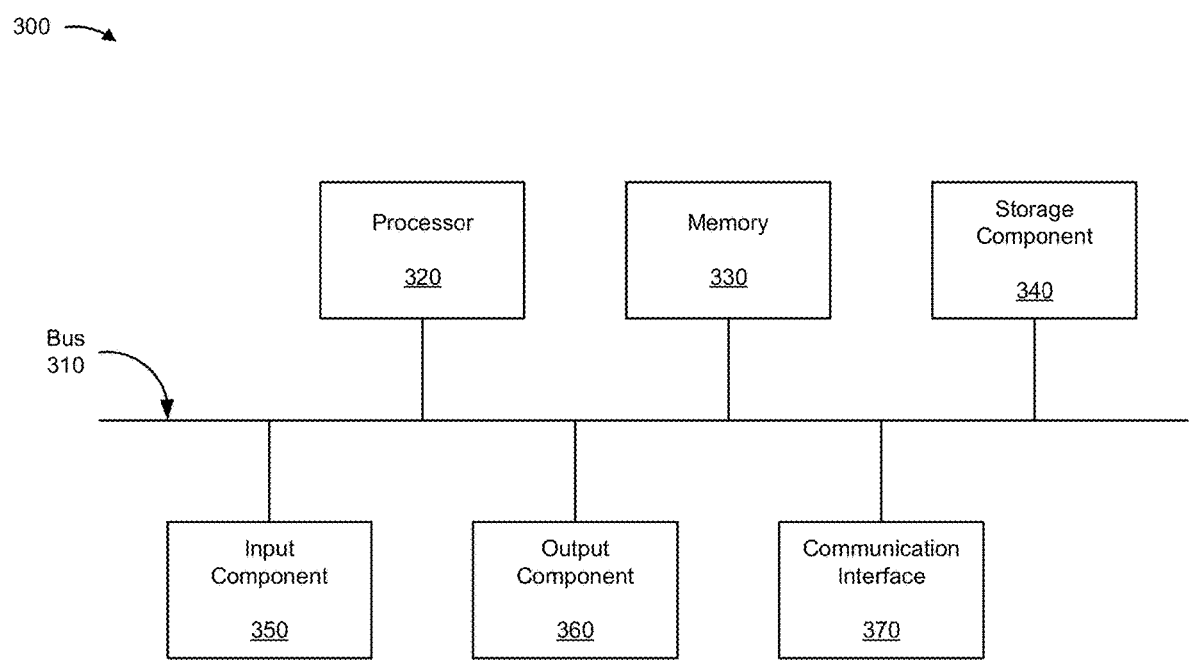
FIG. 3 is a diagram of example components of one or more devices of FIGS. 2A and/or 2B.

FIG. 3 is a diagram of example components of a device 300. Device 300 can correspond to physical reference station 205, client device 210, base station 215, microservice node 220, network RTK device 230, cloud RTK device 235, ephemeris device 240, display server device 245, message queue device 250, adapter device 255, load balancer 260, one or more devices included in network 265, and/or computing resource 270. In some implementations, physical reference station 205, client device 210, base station 215, microservice node 220, network RTK device 230, cloud RTK device 235, ephemeris device 240, display server device 245, message queue device 250, adapter device 255, load balancer 260, one or more devices included in network 265, and/or computing resource 270 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a wireless local area network interface, a cellular network interface, or the like.

Device 300 can perform one or more processes described herein. Device 300 can perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
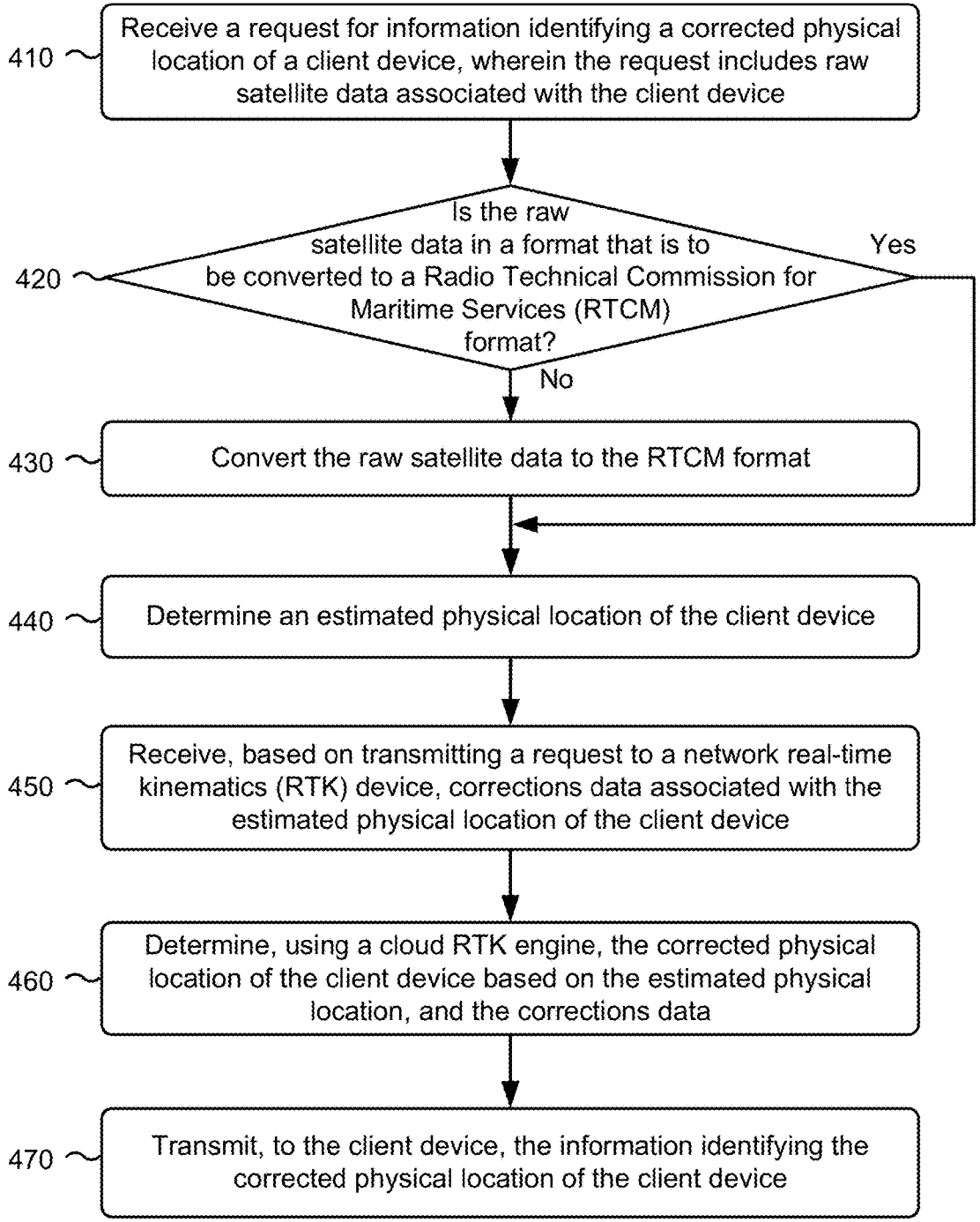
FIG. 4 is a flow chart of an example process for providing a location as a service (LaaS).

FIG. 4 is a flow chart of an example process 400 for providing a hyper-accurate LaaS. In some implementations, one or more process blocks of FIG. 4 can be performed by microservice node (e.g., microservice node 220). In some implementations, one or more process blocks of FIG. 4 can be performed by another device or a group of devices separate from or including the microservice node, such as a physical reference station (e.g., physical reference station 205), a client device (e.g., client device 210), a base station (e.g., base station 215), and/or the like.

As shown in FIG. 4, process 400 can include receiving a request for information identifying a corrected physical location of a client device, wherein the request includes raw satellite data associated with the client device (block 410). For example, the microservice node (e.g., using cloud RTK device 235, computing resource 270, processor 320, memory 330, storage component 340, input component 350, output component 360, communication interface 370 and/or the like) can receive a request for information identifying a corrected physical location of a client device, as described above. In some implementations, the request includes raw satellite data associated with the client device.

As further shown in FIG. 4, process 400 can include determining whether the raw satellite data is in a format that is to be converted to an RTCM format (block 420). For example, the microservice node (e.g., using cloud RTK device 235, computing resource 270, processor 320, memory 330, storage component 340, input component 350, output component 360, communication interface 370 and/or the like) can convert the raw satellite data to the RTCM format, as described above. If the microservice node determines that the raw satellite data is not in a format that is to be converted to the RTCM format (block 420-No), process 400 can proceed to block 440.

As further shown in FIG. 4, if the microservice node determines that the raw satellite data is in a format that is to be converted to the RTCM format (block 420—Yes), process 400 can include converting the raw satellite data the RTCM format (block 430). For example, the microservice node (e.g., using cloud RTK device 235, computing resource 270, processor 320, memory 330, storage component 340, input component 350, output component 360, communication interface 370 and/or the like) can convert the raw satellite data to the RTCM format, as described above.

As further shown in FIG. 4, process 400 can include determining an estimated physical location of the client device (block 440). For example, the microservice node (e.g., using cloud RTK device 235, ephemeris device 240, computing resource 270, processor 320, memory 330, storage component 340, input component 350, output component 360, communication interface 370 and/or the like) can determine an estimated physical location of the client device, as described above.

As further shown in FIG. 4, process 400 can include receiving, based on transmitting a request to a network RTK device, corrections data associated with the estimated physical location of the client device (block 450). For example, the microservice node (e.g., using network RTK device 230, cloud RTK device 235, message queue device 250, adapter device 255, computing resource 270, processor 320, memory 330, storage component 340, input component 350, output component 360, communication interface 370 and/or the like) can receive, based on transmitting a request to a network RTK device, corrections data associated with the estimated physical location of the client device, as described above.

As further shown in FIG. 4, process 400 can include determining, using a cloud RTK engine, the corrected physical location of the client device based on the estimated physical location and the corrections data (block 460). For example, the microservice node (e.g., using cloud RTK device 235, computing resource 270, processor 320, memory 330, storage component 340, input component 350, output component 360, communication interface 370 and/or the like) can determine, using a cloud RTK engine, the corrected physical location of the client device based on the estimated physical location and the corrections data; and, as described above.

As further shown in FIG. 4, process 400 can include transmitting, to the client device, the information identifying the corrected physical location of the client device (block 470). For example, the microservice node (e.g., using cloud RTK device 235, computing resource 270, processor 320, memory 330, storage component 340, input component 350, output component 360, communication interface 370 and/or the like) can transmit, to the client device, the information identifying the corrected physical location of the client device, as described above.

Process 400 can include additional implementations, such as any single implementation or any combination of implementations described below and/or in connection with one or more other processes described elsewhere herein.

In some implementations, converting the raw satellite data to the RTCM format comprises at least one of converting the raw satellite data from a JSON format to the RTCM format or converting the raw satellite data from a binary protocol format to the RTCM format. In some implementations, the corrections data is generated based on virtual location data associated with a VRS among a plurality of VRSs associated with the network RTK device. In some implementations, the VRS is associated with a geographic area in which the estimated physical location of the client device is located.

In some implementations, determining the estimated physical location of the client device comprises receiving, from an ephemeris device, ephemeris data associated with one or more GNSS satellites that are associated with the raw satellite data, and determining the estimated physical location of the client device based on the ephemeris data. In some implementations, process 400 further comprises refining, using a Kalman filter, the corrected physical location of the client device based on sensor data received from the client device to increase the accuracy of the corrected physical location of the client device.

In some implementations, the sensor data comprises at least one of acceleration data associated with the client device or orientation data associated with the client device. In some implementations, process 400 further comprises transmitting, to a display server device, the information identifying the corrected physical location to permit the display server device to host the information identifying the corrected physical location.

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

The foregoing disclosure provides illustration and description, but is not intended to be exhaustive or to limit the implementations to the precise form disclosed. Modifications and variations can be made in light of the above disclosure or can be acquired from practice of the implementations.

As used herein, the term "component" is intended to be broadly construed as hardware, firmware, or a combination of hardware and software.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein can be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features can be combined in ways not specifically recited in the claims and/or disclosed in the specification. Although each dependent claim listed below can directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a microservice node and from a client device, a request for information identifying a corrected physical location of the client device,
      wherein the request includes sensor data associated with the client device;
   converting, by the microservice node, the sensor data to a format readable by a cloud real-time kinematics (RTK) engine;
   determining, by the microservice node, an estimated physical location of the client device based on the converted sensor data;
   receiving, by the microservice node and via a message queue from a message queue device, corrections data associated with the estimated physical location of the client device;
   determining, by the microservice node and using the cloud RTK engine, the corrected physical location of the client device based on:
      the estimated physical location, and
      the corrections data; and
   transmitting, by the microservice node and to the client device, information identifying the corrected physical location of the client device.

2. The method of claim 1, further comprising:
   transmitting a request to a network RTK device; and
   wherein receiving the corrections data comprises:
      receiving the corrections data based on transmitting the request.

3. The method of claim 2, wherein the corrections data is generated based on virtual location data associated with a virtual reference station (VRS) among a plurality of VRSs associated with the network RTK device,
   wherein the VRS is associated with a geographic area in which the estimated physical location of the client device is located.

4. The method of claim 1, wherein determining the estimated physical location of the client device comprises:
   determining the estimated physical location based on raw satellite data.

5. The method of claim 1, further comprising:
refining the corrected physical location of the client device based on data received from the client device to increase an accuracy of the corrected physical location of the client device.

6. The method of claim 1, wherein the microservice node includes a network RTK engine and the cloud RTK engine.

7. The method of claim 1, wherein the microservice node is capable of providing a hyper-accurate location as a service (LaaS) or a hyper accurate post processed LaaS (PPLaaS) to the client device.

8. A microservice node, comprising:
one or more processors configured to:
receive, from a client device, a request for information identifying a corrected physical location of the client device,
wherein the request includes acceleration data associated with the client device;
convert the acceleration data to a format readable by a cloud real-time kinematics (RTK) engine;
determine an estimated physical location of the client device based on the converted acceleration data;
receive, via a message queue from a message queue device, corrections data associated with the estimated physical location of the client device;
determine, using the cloud RTK engine, the corrected physical location of the client device based on:
the estimated physical location, and
the corrections data; and
transmit, to the client device, information identifying the corrected physical location of the client device.

9. The microservice node of claim 8, wherein the one or more processors are further configured to:
transmit a request to a network RTK device; and
wherein the one or more processors, when receiving the corrections data, are to:
receive the corrections data based on transmitting the request.

10. The microservice node of claim 9, wherein the corrections data is generated based on virtual location data associated with a virtual reference station (VRS) among a plurality of VRSs associated with the network RTK device,
wherein the VRS is associated with a geographic area in which the estimated physical location of the client device is located.

11. The microservice node of claim 8, wherein the one or more processors, when determining the estimated physical location of the client device, are to:
determine the estimated physical location based on raw satellite data.

12. The microservice node of claim 8, wherein the one or more processors are further configured to:
refine the corrected physical location of the client device based on data received from the client device to increase an accuracy of the corrected physical location of the client device.

13. The microservice node of claim 8, wherein the microservice node includes a network RTK engine and the cloud RTK engine.

14. The microservice node of claim 8, wherein the microservice node is capable of providing a hyper-accurate location as a service (LaaS) or a hyper accurate post processed LaaS (PPLaaS) to the client device.

15. A non-transitory computer-readable medium storing instructions, the instructions comprising:
one or more instructions that, when executed by one or more processors of a microservice node, cause the one or more processors to:
receive, from a client device, a request for information identifying a corrected physical location of the client device,
wherein the request includes sensor data associated with in the client device;
convert the sensor data to a format readable by a cloud real-time kinematics (RTK) engine;
determine an estimated physical location of the client device based on the converted sensor data;
receive, via a message queue from a message queue device, corrections data associated with the estimated physical location of the client device;
determine, using the cloud RTK engine, the corrected physical location of the client device based on:
the estimated physical location, and
the corrections data; and
transmit, to the client device, information identifying the corrected physical location of the client device.

16. The non-transitory computer-readable medium of claim 15, wherein the one or more instructions, when executed by the one or more processors, further cause the one or more processors to:
transmit a request to a network RTK device; and
wherein the one or more instructions, that cause the one or more processors to receive the corrections data, cause the one or more processors to:
receive the corrections data based on transmitting the request.

17. The non-transitory computer-readable medium of claim 16, wherein the corrections data is generated based on virtual location data associated with a virtual reference station (VRS) among a plurality of VRSs associated with the network RTK device,
wherein the VRS is associated with a geographic area in which the estimated physical location of the client device is located.

18. The non-transitory computer-readable medium of claim 15, wherein the one or more instructions, that cause the one or more processors to determine the estimated physical location of the client device, cause the one or more processors to:
determine the estimated physical location based on raw satellite data.

19. The non-transitory computer-readable medium of claim 15, wherein the one or more instructions, when executed by the one or more processors, further cause the one or more processors to:
refine the corrected physical location of the client device based on data received from the client device to increase an accuracy of the corrected physical location of the client device.

20. The non-transitory computer-readable medium of claim 15, wherein the microservice node is capable of providing a hyper-accurate location as a service (LaaS) or a hyper accurate post processed LaaS (PPLaaS) to the client device.

* * * * *